UNITED STATES PATENT OFFICE.

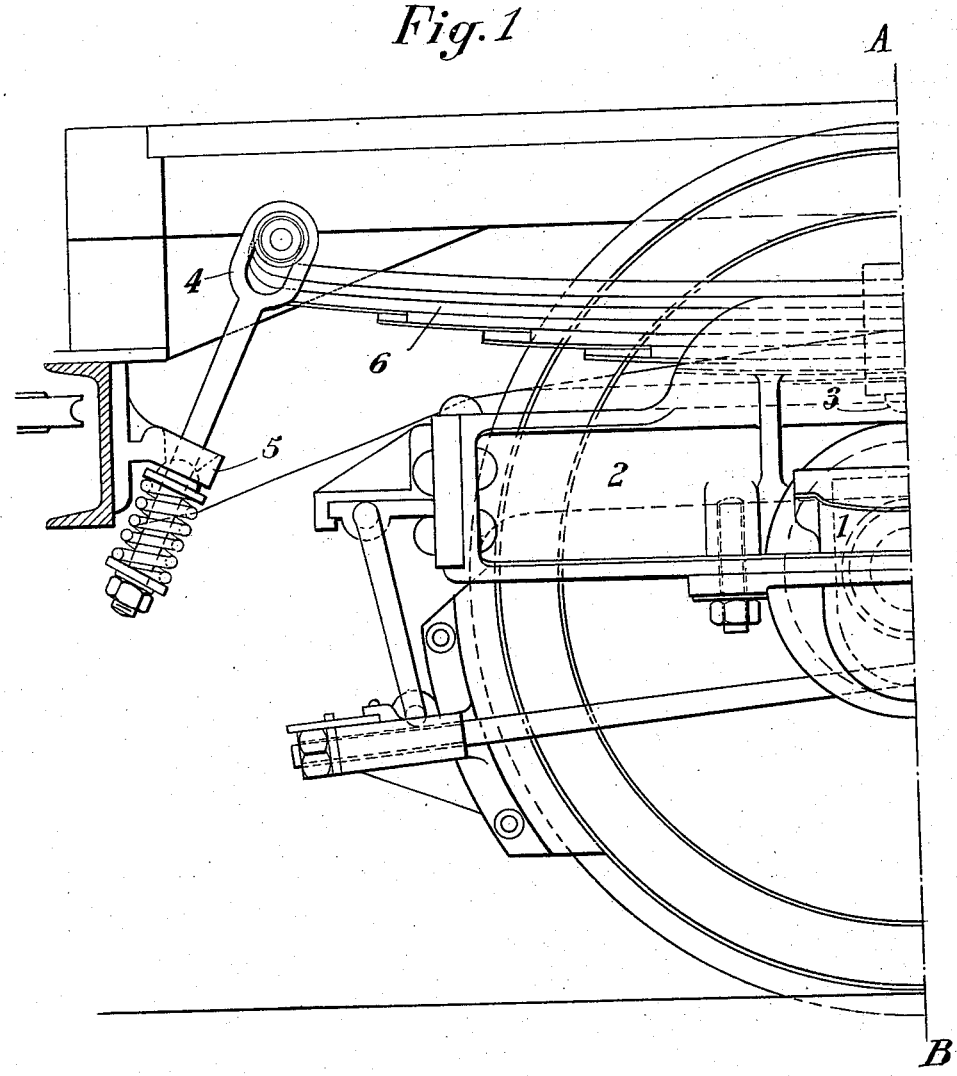

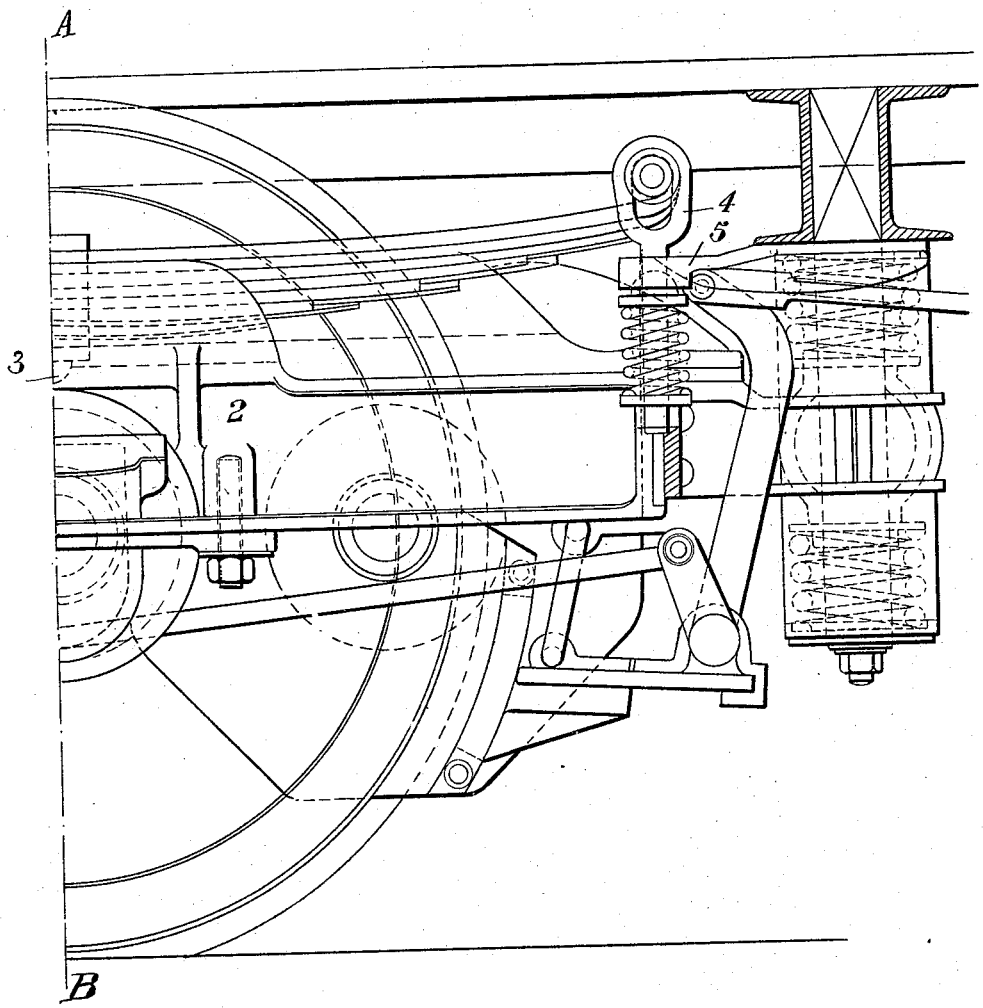

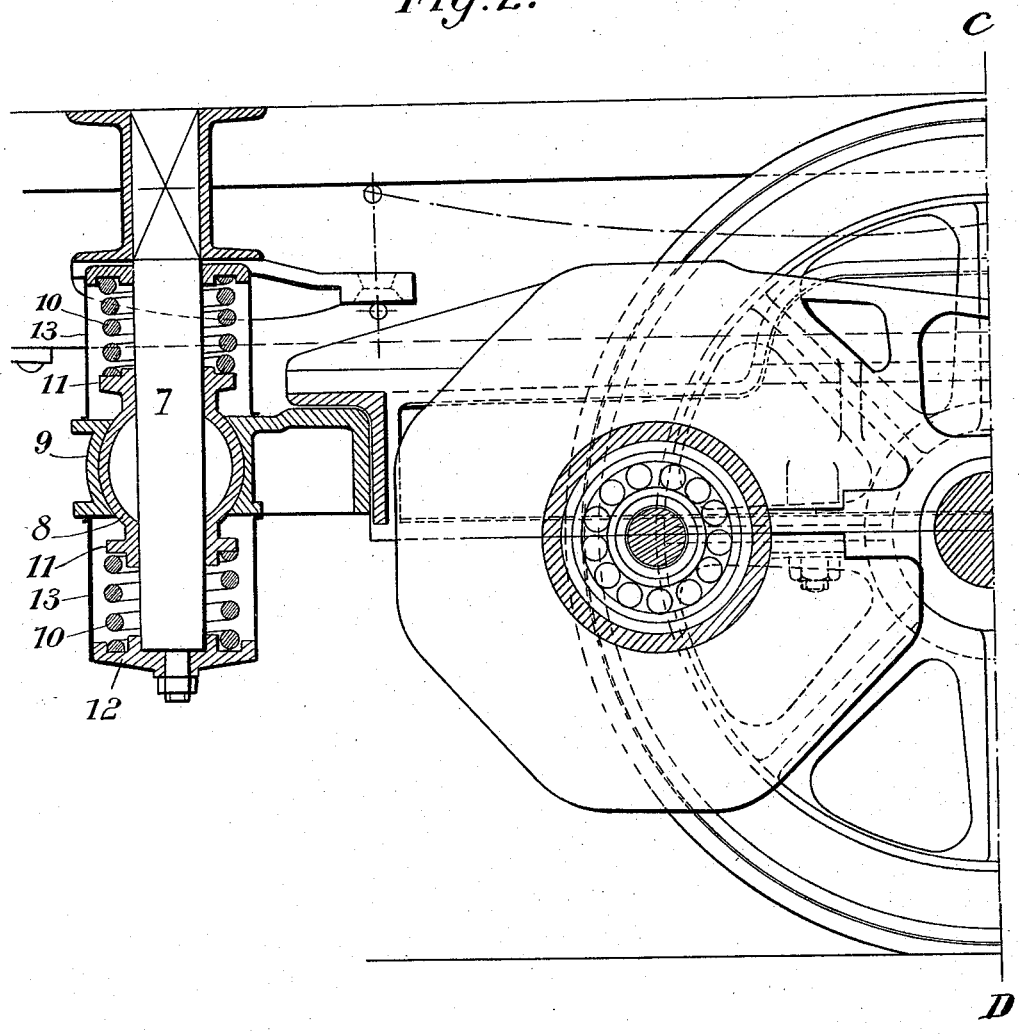

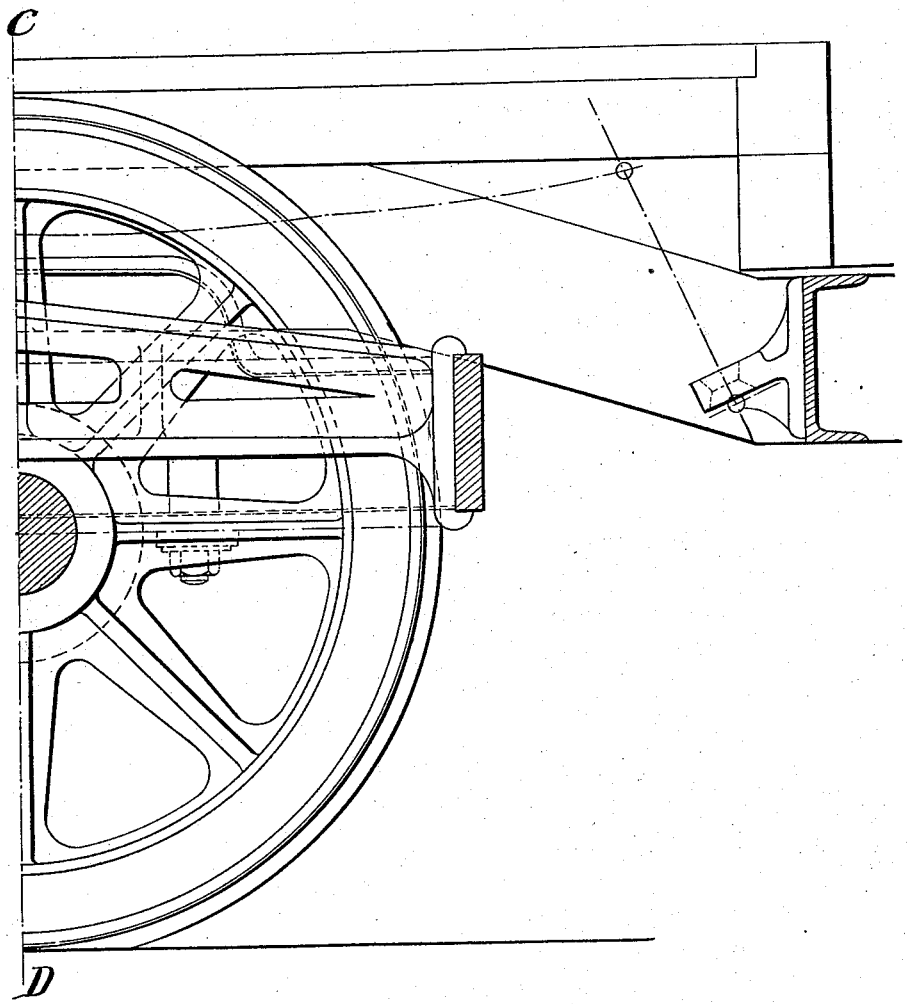

CÉLESTIN DELMEZ, OF ANTWERP, BELGIUM.

SYSTEM OF SUSPENSION FOR TRAMWAY AND RAILWAY CARS.

1,216,960.  Specification of Letters Patent.  Patented Feb. 20, 1917.

Application filed February 10, 1914, Serial No. 817,847. Renewed August 7, 1916. Serial No. 113,617.

*To all whom it may concern:*

Be it known that I, CÉLESTIN DELMEZ, a subject of the Belgian King, and resident of Antwerp, Belgium, have invented certain new and useful Improvements in a System of Suspension for Tramway and Railway Cars, of which the following is a specification.

In my patent application Serial No. 779570 filed July 17th, 1913, I have described a specially constructed suspension of the motors.

This invention relates to a car suspension combined with the ball bearing and the motor suspension described in the patent-application named above. By this novel arrangement, the axle guard can be dispensed with, the radial adjustment of the axles can be obtaind in the curves and the system can be secured and carried on by a universal ball pivot adapted to perform a yielding motion.

Besides, it must be mentioned that this device allows of the brakes being mounted in a simple and effective manner.

The swing links are no longer dependent upon springs inserted between the axle and the car body as they are made integral with the framework itself.

This has for its consequence that whatever be the load, as the framework is adapted to turn around the axis of the axle, the braking surface of the brake shoes will always be concentrical to the surface of the tire.

Generally the brake shoes descend under the load of the carriage and exert a braking action on the wheels only through a part of their surface, this action being less, the greater the load is.

The guard of the axle box is a part of a bogie the upkeep of which is delicate and expensive. Owing to the continuous friction of the box in its guides exposed to the action of mud and dust, these parts wear out and must frequently be replaced.

By fixing the suspending frame of the motor in a rigid manner to the ball bearings as described in my previous application Serial No. 779570, the axle guard is dispensed with and an absolute invariability in the parallelism of the axle and the shaft of the armature is obtained.

In the device forming the subject matter of this invention, bearings are attached directly to a frame, the latter extending from the bearings and providing means on which a motor is suspended.

In order to obtain the radial adjustment of the axles in curves, the body of the car is suspended by means of elastic shackles resting on one side in ball joint supports secured to the framework of the car, and at the other side secured to the ends of the car spring. The latter bears upon the ball bearing through the medium of the ball joint allowing the framework to follow the movements of the motor.

The suspension device of the car body is guided by a ball joint pivot so as to allow it to assume under the car all the positions required, suitable springs being provided for bringing it back each time into its position of equilibrium.

This invention is shown by way of example in one form of embodiment, in the accompanying drawings which show an elevation view, with parts in section of a bogie provided with the new device.

Figure 1 is a side elevation of the right hand end of a truck illustrating the application of my invention.

Fig. 1ª is a similar view of the left hand end of the truck.

Fig. 2 is a central section of one end of the truck viewed from the opposite side of Fig. 1.

Fig. 2ª is a similar view of the opposite end of the truck.

The ball bearing 1 in which rotates the axle of the wheels is constructed interiorly in the manner described in the patent Serial No. 779570, but it is made in one casting with the beam 2 so as to form the two side parts of the suspension frame of the motor.

This suspension frame and the ball bearing 1 form a homogeneous whole with the motor and the axle and wheels so as to form a single axle Bissel bogie.

The car body is suspended by means of elastic shackles 4, which bear at their lower part on ball joint carriers 5 which are secured to the metallic frame of the car and are connected on the opposite side with the ends of the laminated spring 6. These springs 6 rest upon the ball bearing 1 through the medium of a ball joint 3 so that the framework may be able to follow the motor in its starting motion around the center of the axle. The Bissel bogie thus supporting the body of the car is carried on or guided by a ball joint pivot formed of a steel bar 7 secured in an invariable manner by means of a square head between two U irons. The long portion of this rod 7 slides in a cast iron sleeve 8 showing a spherical swelling engaged in a similarly shaped carrier 9 secured to the Bissel bogie.

The sleeve carries at both ends flanges 11, cast integral with it and against which coiled springs 10 bear, the opposite ends of which bear, one against the metallic framework of the body, the other against a disk 12 which is secured to the pivot 7.

Owing to this arrangement the Bissel bogie is able to assume all the required positions under the body of the car. The sleeve 8 is adapted to slide in fact along the rod under the influence of the starting efforts of the motors and to be brought back into its position of equilibrium by the two springs 10.

13 designates a water tight sheet of canvas intended to protect the last named device from dust and mud.

The lubrication is effected by means of graphite powder.

Having now fully described my said invention, what I claim and desire to secure by Letters Patent, is:

1. In combination, a car frame, beams secured to the underside of said car frame, a post depending from one of the beams, a bracket slidably mounted on the post and provided with a socket, a second bracket secured to another of the beams and formed with a socket, rods provided with semi-spherical elements which are seated in the sockets in the brackets, means for resiliently mounting the semi-spherical elements, leaf springs pivotally connected to the rods, the leaf springs having a semi-spherical element on their bottoms, a motor frame having an extension formed with a semi-spherical bearing, a sleeve slidably mounted on the bearing, a sleeve slidably mounted on the depending post and provided with a circular enlargement which fits in the semi-spherical bearing on the motor frame, springs engaging each end of the sleeve, the semi-spherical elements on the leaf springs being supported on the motor frame, bearings carried by the motor frame, and an axle and wheels mounted in said latter bearings.

2. In combination, a car frame, a motor frame located under the car frame, said motor frame having an extension formed with a semi-spherical bearing, a post depending from the car frame, a sleeve slidably mounted on the post and provided with a spherical enlargement which fits in the semi-spherical bearing in the sleeve, springs mounted on the post to engage each end of the sleeve, bearings on the motor frame, an axle and wheels mounted in the latter bearings, leaf springs above the motor frame, the leaf springs having semi-spherical elements on their bottoms and which are supported on the motor frame, and means for yieldingly mounting the ends of the leaf springs on the car frame.

3. In combination, a car frame, a motor frame located under the car frame, said motor frame having an extension formed with a semi-spherical bearing, a post depending from the car frame, a sleeve slidably mounted on the post and provided with a spherical enlargement which fits in the semi-spherical bearing in the sleeve, springs mounted on the post to engage each end of the sleeve, bearings on the motor frame, an axle and wheels mounted in the latter bearings, leaf springs above the motor frame, the leaf springs having semi-spherical elements on their bottoms and which are supported on the motor frame, brackets supported by the car frame each bracket having a semi-spherical socket, rods formed with slots at their ends and extending through the brackets, trunnions extending from the ends of the leaf springs and passing through the slots in the rods, semi-spherical elements slidably mounted on the rods and engaging in the semi-spherical sockets in the brackets, springs on the rods and bearing against the semi-spherical elements, and means for adjusting the tension of said springs.

4. In combination, a car frame, a motor frame having a central extension, means for resiliently mounting the extension on the car frame, said means including means to permit spherical and circumferential movement of the motor frame, bearings rigid with the motor frame, an axle mounted in the bearings, traction wheels on the axle, leaf springs having semi-spherical elements which are supported on the motor frame, and means for resiliently securing the ends of the leaf springs to the car frame.

5. In combination, a car frame, a motor frame having a central extension, means for resiliently mounting the extension on the car frame, said means including means to permit of spherical and circumferential movement of the motor frame, bearings rigid with the motor frame, an axle mounted in the bearings, traction wheels on the axle, leaf springs having semi-spherical elements which are supported on the motor frame, brake shoes mounted on the motor frame to engage with the traction wheels, and means for operating the brake shoes.

In testimony whereof I have hereunto set my hand in presence of two witnesses.

CÉLESTIN DELMEZ.

Witnesses:
G. DE LERSY,
S. ADAMS.